United States Patent
Baehr et al.

(10) Patent No.: US 7,876,084 B2
(45) Date of Patent: Jan. 25, 2011

(54) METHOD FOR THE DETERMINATION OF A VOLTAGE LIMIT OF A CLUTCH ACTUATING MOTOR

(75) Inventors: Markus Baehr, Achern (DE); Juergen Gerhart, Appenweier (DE); Michael Schuhen, Buehl-Oberweier (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 449 days.

(21) Appl. No.: 12/151,664

(22) Filed: May 8, 2008

(65) Prior Publication Data
US 2008/0211480 A1   Sep. 4, 2008

Related U.S. Application Data

(63) Continuation of application No. PCT/DE2006/001817, filed on Oct. 25, 2006.

(30) Foreign Application Priority Data
Nov. 11, 2005   (DE) .................. 10 2005 053 866

(51) Int. Cl.
*G01R 19/00* (2006.01)

(52) U.S. Cl. ..................... 324/76.11; 192/40
(58) Field of Classification Search ............... 324/76.11; 318/808, 812; 192/3.51, 40
See application file for complete search history.

(56) References Cited

U.S. PATENT DOCUMENTS 3,587,071 A * 6/1971 Stegman ................. 360/119.01

FOREIGN PATENT DOCUMENTS

| DE | 19823089 A1 | 12/1998 |
| DE | 10027330 A1 | 12/2000 |
| EP | 1674321 A2 | 6/2006 |
| WO | WO01/63136 A1 | 8/2001 |
| WO | WO03/074896 A3 | 9/2003 |

* cited by examiner

*Primary Examiner*—Vincent Q Nguyen
(74) *Attorney, Agent, or Firm*—Simpson & Simpson, PLLC

(57) ABSTRACT

A method for the determination of a motor voltage limit, wherein a clutch actuator of an automated shift transmission remains motionless, including the steps of (a) raising or lowering a withstand voltage by an increment $\Delta U$, starting from a current withstand voltage ($U_{curr}$), and (b) determining whether the clutch actuator moves under the changed withstand voltage.

10 Claims, 2 Drawing Sheets

METHOD FOR THE DETERMINATION OF A VOLTAGE LIMIT OF A CLUTCH ACTUATING MOTOR

CROSS REFERENCE TO RELATED APPLICATIONS

This application is filed under 35 U.S.C. §120 and §365(c) as a continuation of International Patent Application PCT/DE2006/001817, filed Oct. 25, 2006, which application is incorporated herein by reference. This application also claims priority from German Patent Application No. 10 2005 053 866.5, filed Nov. 11, 2005, which application is incorporated herein by reference.

FIELD OF THE INVENTION

The invention relates to a method for the determination of a voltage limit for a clutch actuating motor, at which a clutch actuator of an automated shift transmission remains motionless. In addition, the invention relates to a device with which the method can be carried out.

BACKGROUND OF THE INVENTION

In automated shift transmissions, for example, parallel shift transmissions, clutches are used which must disengage autonomously in an emergency. Aside from emergency situations, the self-disengagement of the clutches also serves as a simple means of making position referencing of the clutch actuating system possible.

This requirement is accompanied by the need for testing whether the partial clutch systems or clutch systems are self-disengaging and are operable.

In addition, it is known to test the position of the clutches directly, for example, using incremental displacement sensors.

German Patent No. DE 100 27 330 A1 teaches how to determine a positioning of a movably situated element in a shifting apparatus, or of an element coupled therewith, on the basis of other parameters, for example, on the basis of electric currents or the like. In order to be able to determine the position exactly with such a system, it is necessary to determine exactly the limits up to which the actuator remains motionless when there is a load on the actuator. If these limits are not known exactly, that could lead to errors in the calculation of the position.

BRIEF SUMMARY OF THE INVENTION

Starting from that basis, a general object of the invention is to provide a method in which voltage limits for a clutch actuator can be determined precisely.

The method for determining a "withstand" voltage limits is suitable in principle for both self-holding and non-self-holding actuating systems.

The basic idea of the invention comprises a method of changing the withstand voltage in driving situations in which it is not detrimental to driving comfort to move a clutch actuator, changing the withstand voltage by raising or lowering the withstand voltage, starting from a present withstand voltage value at which the clutch actuator is motionless, and checking whether any movement of the clutch actuator can be detected at the changed withstand voltage. The driving situation in which such a small additional actuator movement that is not in connection with a present shifting process can be permitted is preferably a situation in which a movement of the actuator is demanded anyway. According to a preferred embodiment, the method is carried out in such a situation when simultaneously the transmission controller prescribes that the actuator movement which is demanded may be delayed by a short period of time, namely the time that is necessary to carry out the method for determining the motor withstand voltage limits.

The initial position of the actuator is one in which the actuator has preferably been located already for a specified minimum time within its previous destination with a constant target position, i.e., motionless. Defining a minimum time before the execution of the withstand voltage limit test during which the actuator is motionless, ensures that the actuator is not moving at the moment the test begins. Then, instead of the movement requested by the actuator, first the procedure for the determination of a motor withstand voltage limit is executed, and immediately following that procedure the normal position controller is activated in order to perform the actuator movement.

According to a preferred embodiment, in the method for determination of withstand voltage limits, if a movement of the clutch actuator is detected under the changed present voltage, the voltage which is current at the moment, or a value assigned to it, is adapted, that is, it is noted by the control system as the new value of the withstand voltage limit.

Preferably, the steps of raising or lowering the withstand voltage by a defined increment $\Delta U$, and the detection of whether the clutch actuator moves under the changed withstand voltage, are repeated until a movement of the clutch actuator can be detected, so that it can be concluded that a withstand voltage limiting value has been reached.

A movement of the clutch actuator is preferably only registered as movement if the clutch actuator moves more than a defined minimum distance $\Delta X_{min}$. That makes it possible to rule out small movements which are caused for example by vibrations or the like from erroneously leading to the conclusion that movement has occurred outside of the withstand voltage range, i.e., a range in which the actuator does not move.

Preferably, after the withstand voltage has been increased by an increment $\Delta U$, one waits a prescribed time $\Delta t$ before conclusively determining that there is no movement of the actuator. Since possibly a certain time passes, due to the inertia of the components, before the actuator moves, observing the waiting time $\Delta t$ enables one to rule out the possibility that the voltage has reached a limit at which the clutch actuator begins to move without this having been detected.

The current withstand voltage, which is the starting point and which is raised or lowered by an increment $\Delta U$, can be any desired withstand voltage when the actuator is not moving. Starting from this momentary voltage, to determine an upper withstand voltage limit, the withstand voltage is raised gradually in a ramp pattern by increments $\Delta U$ until a movement of the clutch actuator can be detected. To determine a lower withstand voltage limit, starting from the momentary withstand voltage, which is used as the current withstand voltage, the withstand voltage is lowered gradually by increments $\Delta U$ until the actuator moves (negative ramp). In a test of this type, which continues until a limit voltage can finally be recognized. The duration of the test is indeterminate at the beginning.

According to another preferred embodiment, a previously known upper withstand voltage limit $U_{up}$ or a known lower withstand voltage limit $U_{dn}$ is defined as the current withstand voltage $U_{curr}$. These withstand voltage limits may be known from prior procedures or from presettings, and correspond to an approximate value for the withstand voltage limit. The method can then be carried out when checking over the withstand voltage limits or for fine adjustment, in which case the known upper withstand voltage limits or lower withstand voltage limits are set as the current withstand voltage $U_{curr}$; and starting from that point, for fine adjustment of the upper withstand voltage limit $U_{up}$ the current withstand voltage $U_{curr}$ is raised by an increment $\Delta U$, or for fine adjustment of the lower withstand voltage limit the current withstand voltage $U_{curr}$ is lowered by the increment $\Delta U$. For assessment, in this method preferably the current withstand voltage limit is changed in every case; namely if a movement is detected and the upper withstand voltage limit was to be determined, the upper withstand voltage is lowered by a value $U_{inc}$, whereas in the case where no movement is detected it is raised by a value $U_{inc}$. Conversely, if no movement is detected the lower withstand voltage limit is lowered by a value $U_{inc}$, whereas it is raised by a value $U_{inc}$ if a movement is detected. Thus if a movement is detected in the range between $U_{dn}$ and $U_{up}$, in which there is no actuator movement, i.e., the withstand voltage range, is reduced in size, whereas if no movement is detected it is enlarged. Hence with this type of execution of the method the predefined test duration can be determined in advance, namely at maximum the waiting time $\Delta t$ plus the initialization and assessment. However, the method may need to be repeated to arrive at absolute withstand voltage limits.

With such known withstand voltage limits as are being used as the starting points, it is preferably possible to estimate in advance the voltage increment by which the limits will be raised or lowered, preferably as:

$$\Delta U = \frac{\Delta \rho}{\left(\frac{\Delta t}{k_e}\right) + \left(\frac{JR}{k_e^2 k_t}\right)\left(e^{-\Delta t \frac{k_e k_t}{JR}} - 1\right)}$$

where $\Delta t$ is the available time, $\Delta_\phi$ are position incremental intervals, where preferably two position increment changes are observed, $k_t = k_e$ is a motor constant, R is the total electrical resistance comprising the motor resistance, the resistance of the tension lines and the resistance of the activating electronics, and J is the moment of inertia of the motor and the actuator gears. The test time $\Delta t$ is defined as a whole multiple of the position controller scan time, for example 2.5 ms.

To adapt the withstand voltage limit, it is likewise possible to change the known voltage limiting values $U_{up}$, $U_{dn}$ by this increment $\Delta U = U_{inc}$. Alternatively, a different fixed value $U_{inc}$ can also be employed for the adapted withstand voltage limit after the test. In each case it is preferred to change the characteristic map independent of the outcome of the test, i.e., both when a movement is detected and when no movement is detected. The value $U_{inc}$, by which the withstand voltage limit is changed after the tests are conducted, may be the increment $\Delta U$ used for the test or any other arbitrary value, in particular one larger or smaller than the increment $\Delta U$. In addition, it is also possible to use different values for raising and for lowering, or even to specify the values as percentage values, for example percentages of a present absolute value of the prior withstand voltage limit.

BRIEF DESCRIPTION OF THE DRAWINGS

The invention will be described below by way of example on the basis of the accompanying figures, which show the following.

DETAILED DESCRIPTION OF THE INVENTION

Figure 1:
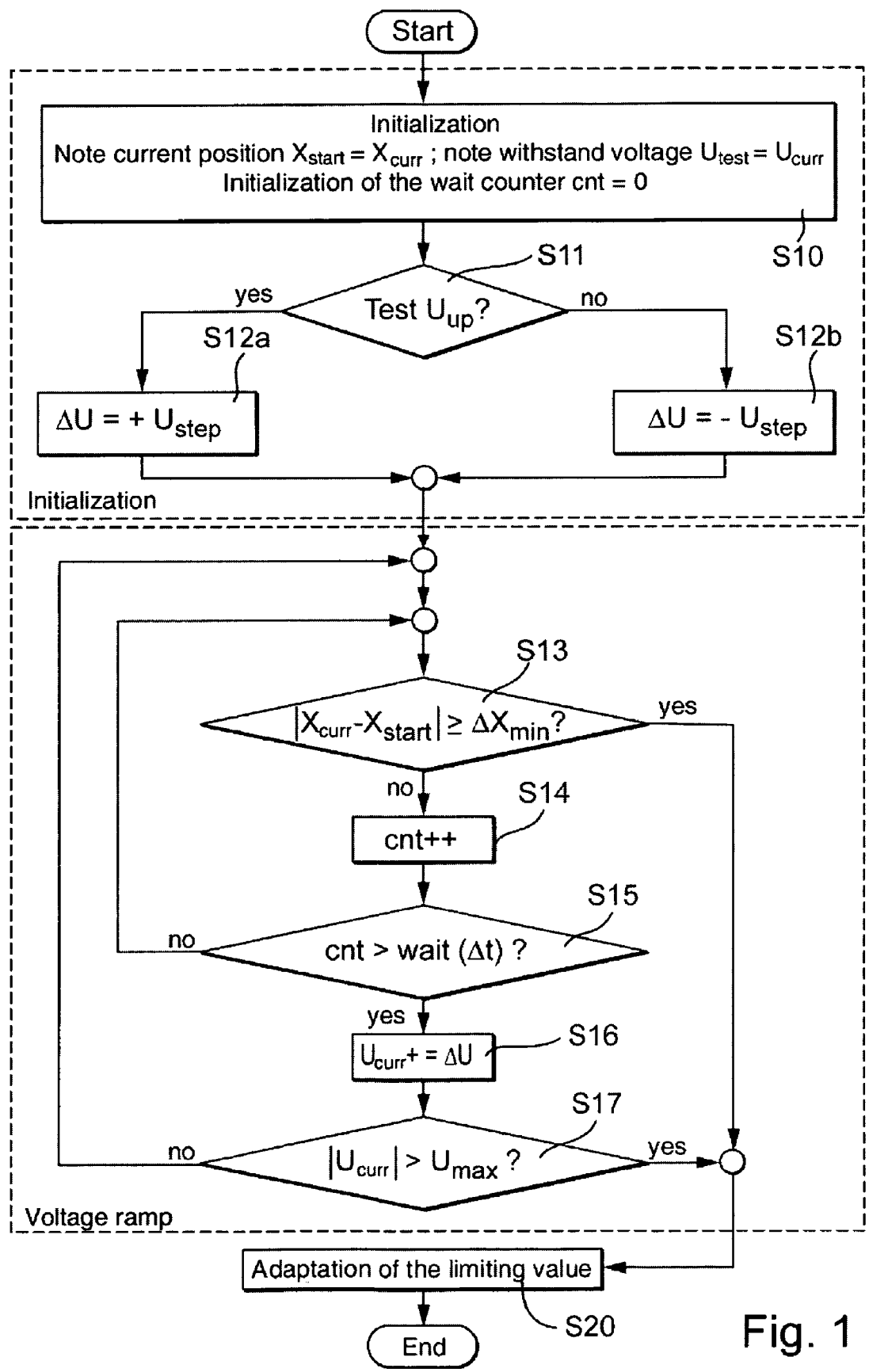
FIG. 1 illustrates a flow chart of a first embodiment of the invention.

In the embodiment of the method for the determination of a motor voltage limit depicted in FIG. 1, an upper limit or a lower limit for the withstand voltage is unknown or is ignored.

If a clutch controller or transmission controller detects that a driving condition exists in which a time-indeterminate withstand voltage limit test can be performed, the procedure is first initialized. To that end, in step S10 the controller registers the present position $X_{curr}$ and notes it as $X_{start}$. Likewise, the momentary voltage, at which the clutch actuator does not move, namely $U_{curr}$, is set as the starting voltage $U_{test}$. Finally, a wait counter which monitors a passage of time is set to zero: cnt=0. This counter is implemented for example by means of the position controller interrupt, so that the wait time is determined by counting position controller calls.

After the initialization in step S10, the method defines in step S11 whether an upper withstand voltage limit $U_{up}$ or a lower withstand voltage limit $U_{dn}$ is to be determined. This means that the direction of the withstand voltage limit test in determined. Preferably, the direction in which the procedure is carried out corresponds to the direction in which a requested movement of the clutch actuator takes place immediately following the execution of the procedure. If an upper withstand voltage limit $U_{up}$ is to be determined, in step S12a the method sets an increment $\Delta U$ to a positive step size $+U_{step}$. Otherwise in step S12b the method sets the increment $\Delta U$ to a negative step size $-U_{step}$. In principle, different step sizes can also be chosen, contrary to the depicted embodiment.

After the initialization, the method progresses to the actual withstand voltage limit test, in which a voltage ramp is employed and the determination is made as to when the clutch actuator begins to move.

To that end it is first determined, for example by means of incremental displacement sensors, whether the clutch actuator is beginning to move at the momentary voltage $U_{curr}$, by comparing the current position $X_{curr}$ with the noted starting position $X_{start}$. If it is detected in this comparison in step S13 that the change is greater than a predefined limit $\Delta X_{min}$, the method recognizes that a withstand voltage limit has been reached and adapts the limiting value in S20. The method ends in this case with the adaptation of the limiting value in Step S20.

If no movement is detected in step S13, or if there is too small a movement, which is below the limiting value $\Delta X_{min}$, the counter cnt is incremented in step S14. In step S15 the method determines whether or not a wait time $\Delta t$ has already been exceeded. If it is determined in step S15 that the wait time, which is preferably defined depending on the inertia of the system and corresponding to its acceleration capability, has not yet been exceeded, the method returns to step S13 and checks again whether there is movement. This loop continues to be repeated until it is recognized in step S15 that a maximum wait time has been exceeded; that is, steps S13, S14 and S15 are repeated continuously within the prescribed wait time $\Delta t$.

If the actuator still does not move even after the complete wait time in step S15 has expired, in step S16 the current withstand voltage limit is again raised or lowered by the increment $\Delta U$. Step S17 starts with a check of whether the current withstand voltage is below a maximum withstand voltage. When a defined maximum value is reached, the procedure ends immediately and the current voltage reached up to that point is adapted in step S20 as the withstand voltage. If the limiting value $U_{max}$, which is for example a limiting value that can be defined by mechanical specifications (overload conditions), has not yet been reached, the method returns to step S13 and begins to repeat steps S13 to S17.

Preferably the rate chosen for the voltage ramp, i.e., $\Delta U$, is relatively low, so that a finely adjusted withstand voltage limit can be adapted at the end of the voltage limit test. The finer or smaller $\Delta U$ is chosen, however, the longer the test procedure may take, since more intermediate positions must be gone through before the withstand voltage limit is reached.

Figure 2:
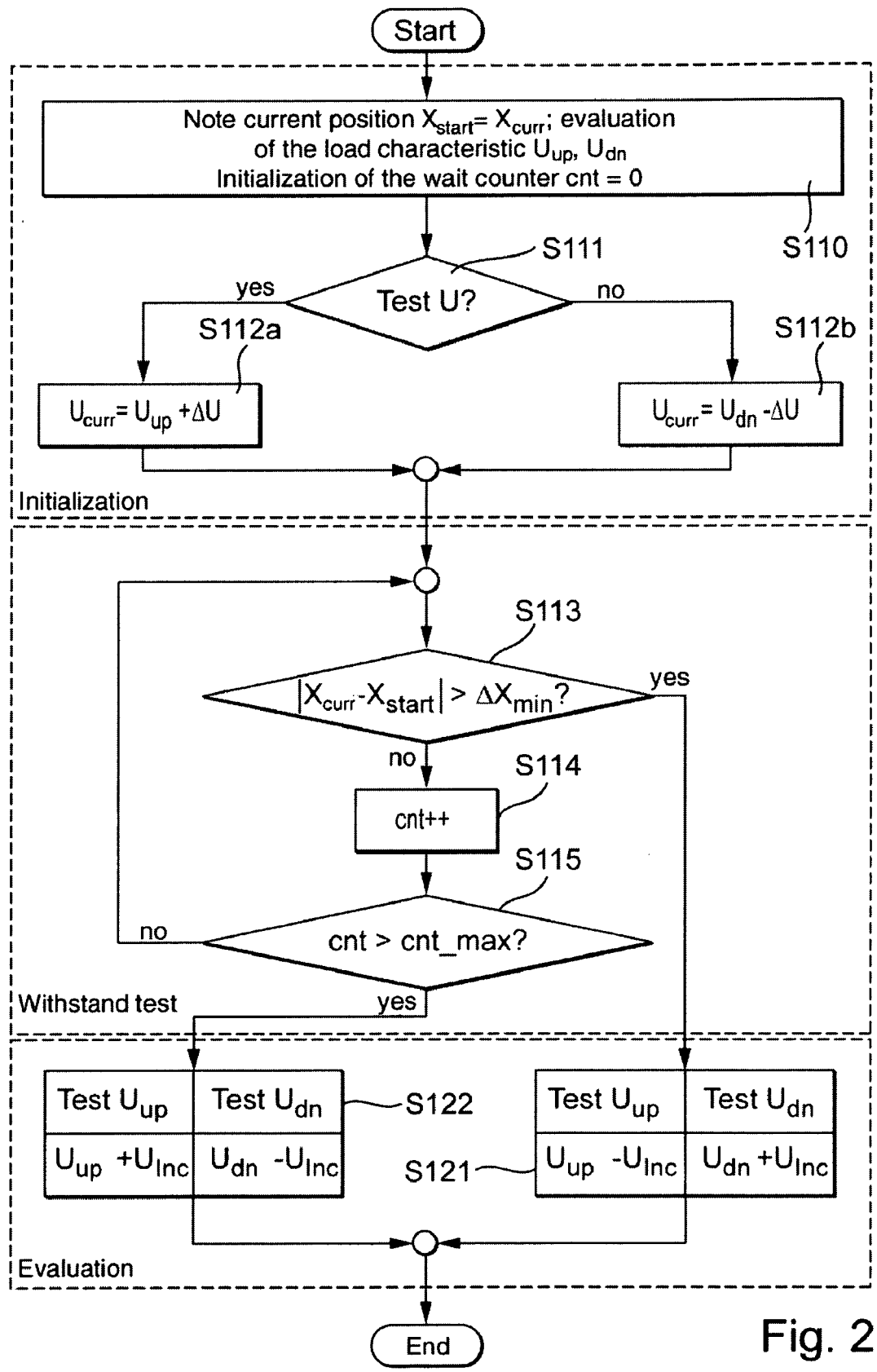
FIG. 2 illustrates a flow chart of a second embodiment of the invention.

An alternative embodiment of the method, which starts from known or assumed limits $U_{up}$, $U_{dn}$ for the withstand voltage and which includes a check of whether these limits are too loosely or too tightly defined, is depicted in the flow chart in FIG. 2.

First of all, if the controller determines that conducting a withstand voltage test will not be detrimental to driving comfort, since a small delay in the provided actuator movement is insignificant, an initialization is again performed. In contrast to the method described in connection with FIG. 1, in the initialization in step S110 the current withstand voltage is not noted when the actuator is motionless, but rather the load characteristic is evaluated, in particular in regard to the previous, for example assumed, withstand voltage limits $U_{up}$, $U_{dn}$. In addition, the present actual position is noted ($X_{start}=X_{act}$) and a wait counter is initialized (cnt=0).

Next the determination is made in step S111 as to whether an upper or a lower withstand voltage limit is to be adjusted. If an upper withstand voltage limit is to be adjusted, in step S112a a current withstand voltage $U_{curr}$ is set to the prior assumed upper withstand voltage limit $U_{up}$ plus an increment $\Delta U$. If a lower withstand voltage limit is to be adjusted, in step S112b a current voltage $U_{curr}$ is set to $U_{dn}-\Delta U$, i.e., to the prior lower withstand voltage limit less an increment $\Delta U$.

The increment $\Delta U$ or the additional voltage $\Delta U$ can be estimated in advance on the basis of the motor constant, the electrical resistance and the moment of inertia of the motor and the actuator gears. This additional voltage corresponds to an additional voltage that is necessary in order to move the actuator in a predefined available time $\Delta t$, starting from a standstill, through one to two position incremental intervals $\Delta T$. Alternatively, it is also possible to define $\Delta U$ on the basis of empirical values. Moreover, $\Delta U$ can be defined the same or differently for adjusting the upper withstand voltage limit and the lower withstand voltage limit.

After the initialization, a determination is made of whether a movement of the actuator occurs under the present voltage $U_{curr}$. To that end the current position $X_{curr}$ is compared with the starting position, and in step S113 the difference between the two positions is compared with a minimum movement distance $\Delta X_{min}$. If an actuator movement is detected, it is concluded that the assumed withstand voltage limits were set too broadly, so that in step S121, when testing in reference to the upper withstand voltage limit $U_{up}$, the latter is reduced by an increment $U_{inc}$ starting from the prior value, or when testing a lower withstand voltage limit $U_{dn}$ the prior value is increased by an increment $U_{inc}$, so that the withstand voltage range as a whole is defined more narrowly. The withstand voltage test ends in this case after the change to the characteristic map in step S121.

If there is still no movement detected in step S113, then in steps S114, S115, corresponding to steps S14 and S15 from FIG. 1, a check is performed of whether a wait time $\Delta t$ has already expired. If appropriate, steps S113 through S115 are repeated until the wait time in step S115 is recognized as having expired.

If no actuator movement is detected in step S113, despite the wait time having expired, a corresponding evaluation is performed in step S122, together with an adaptation of the characteristic maps. In particular, if the upper withstand voltage limit $U_{up}$ has been tested to conclusion and no movement of the actuator has been detected during the withstand time, the conclusion is drawn that the withstand voltage limits have been defined too narrowly so far, and an upper withstand voltage limit $U_{up}$ is raised by an increment $U_{inc}$, or a lower withstand voltage limit $U_{dn}$ is lowered by an increment $U_{inc}$ if the lower withstand voltage limit has been tested to conclusion. The procedure ends after the adaptation of the characteristic maps in Step S122.

The increments $U_{inc}$ in steps S121, S122 can correspond here to the increment by which the current assumed withstand voltage limit is raised or lowered in steps S112a and S112b, or they can be set larger or smaller, independent of this increment. The smaller the increment $U_{inc}$ is chosen, the more finely the withstand voltage limits can be adjusted. On the other hand, the total time until one arrives at a tested, absolute withstand voltage limit through multiple repetitions of the procedure increases.

The essential aspect of the invention thus comprises determining the withstand voltage limits by completely testing the withstand voltage.

What is claimed is:

1. A method for the determination of a motor voltage limit, wherein a clutch actuator of an automated shift transmission remains motionless, comprising the steps:
   (a) raising or lowering a withstand voltage by an increment $\Delta U$, starting from a current withstand voltage ($U_{curr}$); and,
   (b) determining whether the clutch actuator moves under the changed withstand voltage.

2. The method recited in claim 1, wherein the current withstand voltage is adapted as the withstand voltage limiting value when there is movement of the clutch actuator.

3. The method recited in claim 1, wherein steps (a) and (b) are repeated until the clutch actuator moves.

4. The method recited in claim 1 wherein a movement of the clutch actuator is only detected as a movement in step (b) if the clutch actuator moves more than a predetermined minimum distance $\Delta X_{min}$.

5. The method recited in claim 1 wherein, after raising or lowering the withstand voltage, the procedure waits for a predetermined time $\Delta t$ before finally determining in step (b) whether the clutch actuator moves.

6. The method recited in claim 1 wherein the current withstand voltage $U_{curr}$ is measured with the clutch actuator motionless.

7. The method recited in claim 6 wherein a determination is made in advance as to whether an upper or a lower withstand voltage limit is to be determined, and wherein, if an upper withstand voltage limit is to be determined, then the current withstand voltage $U_{curr}$ is raised by the increment $\Delta U$ in step (a), and wherein, if a lower withstand voltage limit is to be determined, then the current withstand voltage $U_{curr}$ is lowered by the increment $\Delta U$ in step (a), and wherein steps (a) and (b) are carried out until the actuator moves.

8. The method recited in claim 1 wherein in step (a) the current withstand voltage $U_{curr}$ is set as a known upper withstand voltage limit $U_{up}$ or as a known lower withstand voltage limit $U_{dn}$, the current withstand voltage $U_{akt}$ is raised by the increment $\Delta U$ in step (a) if an upper withstand voltage limit $U_{up}$ is to be determined, and the current withstand voltage $U_{curr}$ is lowered by the increment $\Delta U$ in step (a) if a lower withstand voltage limit $U_{dn}$ is to be determined.

9. The method recited in claim 8 wherein the upper withstand voltage limit $U_{up}$ is raised by a value $U_{inc}$ or the lower withstand voltage limit $U_{dn}$ is lowered by a value $U_{inc}$, if no movement is detected in step (b), and the upper withstand voltage limit $U_{up}$ is lowered by a value $U_{inc}$ or the lower withstand voltage limit $U_{dn}$ is raised by a value $U_{inc}$, if a movement is detected in step (b).

10. A device for determining a motor voltage limit, where a clutch actuator of an automated shift transmission remains motionless, having a control system that is adapted to carry out a method for the determination of a motor voltage limit, wherein a clutch actuator of an automated shift transmission remains motionless, said device comprising:
(a) a means for raising or lowering a withstand voltage by an increment $\Delta U$, starting from a current withstand voltage ($U_{curr}$); and,
(b) a means for determining whether the clutch actuator moves under the changed withstand voltage.

* * * * *